Aug. 26, 1930.  R. STRESAU  1,774,112
ANTIGLARE ROLLER CURTAIN FOR AUTOMOBILES
Filed July 30, 1928
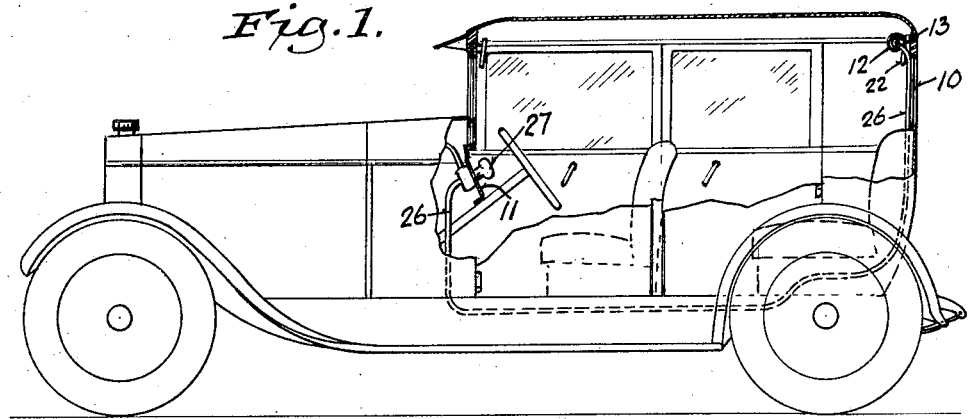
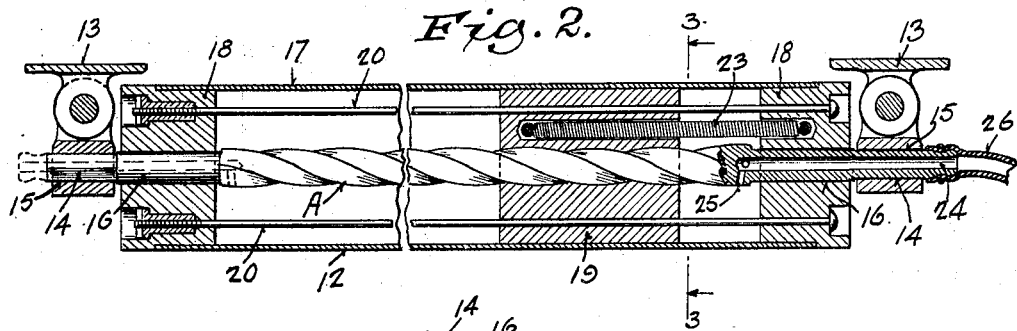
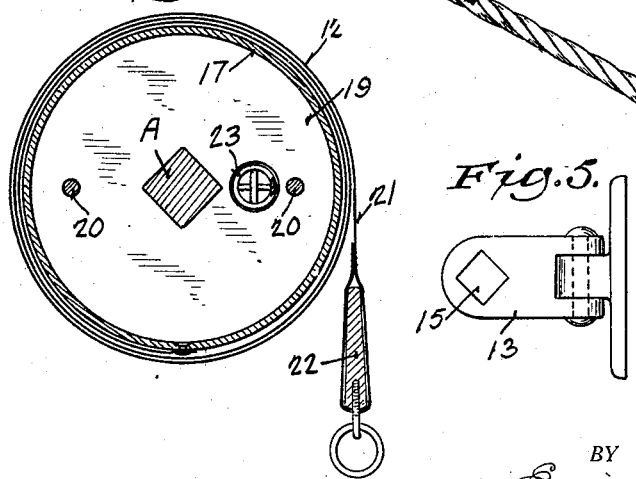
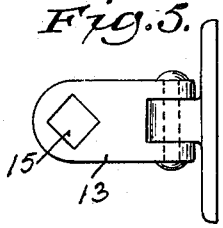
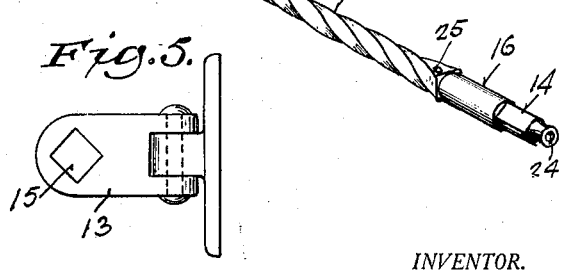
INVENTOR.
RICHARD STRESAU
BY
*Erwin, Wheeler & Woolard*
ATTORNEYS.

Patented Aug. 26, 1930

1,774,112

UNITED STATES PATENT OFFICE

RICHARD STRESAU, OF WAUWATOSA, WISCONSIN

ANTIGLARE ROLLER CURTAIN FOR AUTOMOBILES

Application filed July 30, 1928. Serial No. 296,113.

In operating an automobile at night, the driver is often very much confused and his power of vision is seriously impaired by the lights reflected on the windshield and rear view mirror of his car, coming from automobile approaching from the rear. Frequently, the reflected lights are flashed with such suddenness as to practically blind the driver at a critcal moment, and at an instant when safety requires clear vision in the avoidance of accidents.

My present invention relates to a quickly operated roller curtain or shade for the rear window of the automobile, such curtain or shade being constructed and arranged so as to be operated in a practically instantaneous manner to intercept the lights flashed from the rear, and thus prevent interference with the clear vision of the driver of the car provided with such a curtain or shade.

While particularly intended for use in double seated cars, in which the curtain or shade is beyond the reach of the operator of the car, the invention is applicable also to single seated cars, and in the latter the operating means for the curtain or shade, conveniently arranged within easy reach of the driver, obviates the exertion and delay necessary to draw the curtain or shade manually.

The curtain or shade is mounted upon a roller of peculiar construction, and is disposed adjacent the window in the car so that when the roller is given an impulse of rotation in the actuation of the controlling devices by the driver of the car, the curtain or shade is unrolled instantly and made to cover the window, and in that manner exclude the blinding lights from entry into the car.

Preferably a pneumatic connection, either pressure or suction, leading from a fixture on the instrument board, or at other point within convenient reach of the driver, to the curtain fixture, is used to effect rotation of the roller to lower the curtain to shielding position. The curtain or shade may be automatically re-wound upon the roller, which in its normal position, leaves the window uncovered.

The roller is formed as a tube having as its axis a shaft of polygonal cross sectional formation intermediate its ends, the intermediate section of the shaft being twisted or fluted helically so as to produce a screw of steep pitch. The ends of the shaft are supported in brackets attached adjacent the window. A traveller responsive to the pressure or draft exerted, is threaded upon the shaft within the tube, and in its movement along the shaft is given a rotary motion, which, through devices to be described, is translated into rotatory motion of the tube of the roller to lower the curtain.

The structural details of my invention will now be described, and the novelty thereof will be pointed out in the appended claims.

In the accompanying drawing:

Figure 1 is a conventional, vertical sectional view, lengthwise of the body of an automobile showing the relative arrangement of the parts constituting my invention.

Fig. 2 is a horizontal section through the curtain roller of special construction embodying my invention.

Fig. 3 is a transverse section through the roller on the line 3—3, Fig. 2, showing the curtain as wound upon the roller.

Fig. 4 is a perspective view of the fluted shaft forming the axis of the roller.

Fig. 5 is a view in elevation of one of the brackets used in supporting the roller in position.

In the drawing, Fig. 1 shows conventionally the interior of a two seated automobile, the body of which is provided with a rear window 10, and an instrument board 11 in front of the driver's seat, as usual. Arranged immediately above the window 10 is a curtain roller 12, which is adapted to be operated from the driver's seat to unwind the curtain or lower the latter so as to shield the window and exclude the entry of the blinding lights thrown out by automobiles which are following.

Two brackets 13, 13, are attached to the body of the automobile at the inside, near the upper corners of the window 10. These brackets support in horizontal position a shaft indicated A in Fig. 4. The ends of the shaft may be squared as at 14, and the brackets formed with corresponding openings 15, to maintain the shaft against rotation, but the ends of the shaft may be rounded and the brackets 13 provided with corresponding openings, and the ends of the shaft clamped or keyed in the brackets for the same purpose. This feature of construction is not material, but it should be such as will serve to support the shaft A in the brackets 13, without permitting rotation of the shaft. The ends of the shaft immediately adjoining the portions 14 are rounded as at 16, to form journal supports for the curtain roller 12, as will be described. The section of the shaft intermediate the end portions 14 and 16, is formed conveniently of irregular cross section, and is twisted so as to produce a helical fluting or screw of steep pitch. The brackets 13 preferably are constructed in two parts, one swiveled on the other, so as to permit alignment of the openings 15 when the shaft is placed in position therein.

A tube 17 of light material constituting the shell of the curtain roller is closed at its ends with fixed plugs 18, which latter are provided with axially extending bores for the reception of the journals 16 of the shaft A, this manner of mounting permitting the tube 17 to rotate freely about the shaft A.

Threaded upon the fluted portion of the shaft A is a traveller 19, adapted to traverse the shaft A lengthwise in the space between the plugs 18. The traveller 19 is perforated at opposite points for the reception of parallel guiding wires 20, extending between the plugs 18, and placed under tension to afford easy movement of the traveller over the same.

The shaft A being held against rotation by the brackets in which it is mounted, movement of the traveller 19 along the helically fluted or screw threaded shaft will rotate the traveler, and through its pressure upon the straining wires 20 attached to the plugs 18, will transmit that rotation to the tube 17 of the roller.

One end of a curtain or shade 21, is attached to the tube 17 in the usual manner, and the curtain is wound a few times around the roller formed by the tube. The free edge of the curtain 21 carries a stick or bar 22, which is weighty enough to influence the downward movement of the curtain at the instant that the roller is unwound, for the purpose of shielding the rear window of the car. As indicated, movement of the traveller 19 in one direction serves to unwind the curtain 21. Reverse movement of the traveller acts to wind up the curtain 21 upon the roller.

I have found it convenient for the purposes of my invention to utilize a contracting spring 23, attached at one end to one of the plugs 18, and at the other in a bore in the traveller 19, so that in the reverse movement of the traveller and rotation of the roller, the curtain is rewound upon the roller, leaving the rear window 10 uncovered.

While various means may be used to cause the traveller 19 to function for the purposes of my invention, I have found it convenient to operate the same by atmospheric compression, using the space within the tube 17 of the roller as a cylinder, and the traveller 19 as a piston. To admit the pressure to the cylinder, I bore one end of the shaft as at 24 to a point just inside of the adjacent plug 18, and form at the end of the bore a port 25, for admitting pressure to the cylinder, to actuate the piston 19 and lower the curtain 21. A tube 26, the course of which is indicated by dotted lines in Fig. 1, leads to the instrument board 11, upon which is a valve 27, within easy reach of the driver, so that it may be operated to admit pressure to the tube 26 to effect the lowering of the curtain or shade 21. The pressure may be furnished by the exhaust of the car or by a pump or by other means. Obviously, if the contracting spring 23 be arranged to influence oppositely the return motion of the piston, the device may be operated by suction. Or, by boring both ends of the shaft and connecting tubes to both of such ends, the return motion of the piston will likewise be effected by positive means.

It is preferable that the curtain or shade be made of some translucent material, so as to screen out the blinding rays of the lights, yet permit the subdued light to pass through the curtain, so that the driver of the car may be on notice that another car is at the rear.

While I have shown and described my preferred means for moving the traveller so as to actuate the roller, it is obvious that means other than those shown and described may be used for this purpose.

Having thus described my invention, what I claim and desire to secure by Letter Patent of the United States, is:

1. A glare shield for the rear window of an automobile, comprising a roller provided with a curtain or shade, a fixedly mounted shaft upon which the roller is journaled for rotation, the shaft being formed intermediate its ends and exteriorly as a screw portion of steep pitch, a rotatable traveler threaded on the screw portion of the shaft and movable over the same within the roller, connections between the traveler and the roller to effect rotation of the traveler and the lowering of the curtain, and means for moving the traveler.

2. A glare shield for the rear window of an automobile, comprising a roller supported in operative relation to the said window and provided with a curtain or shade, the said roller comprising a tube constituted as a cylinder, an axis therefor comprising a shaft fixedly mounted at its ends with an intermediate exterior screw portion of steep pitch, a traveler threaded upon the screw portion and movable over the same within the tube, connections between the traveler and the tube, and means for moving the traveler lengthwise of the screw to effect rotation of the tube and place the curtain over the window.

3. A glare shield for the rear window of an automobile, comprising a roller supported in operative relation to the said window and having a curtain or shade wound thereon, the said roller being composed of a tube closed at its ends to constitute a cylinder, a shaft fixedly mounted at its ends with an intermediate exterior screw portion of steep pitch on which the tube is journaled for rotation, a movable traveler threaded on the screw portion and connected to the tube, and means for controlling pressure in the cylinder to move the traveler along the shaft to rotate the roller and unwind the curtain or shade.

4. A glare shield for the rear window of an automobile, comprising a roller supported in operative relation to the said window and having a curtain or shade wound thereon, the said roller being composed of a tube closed at its ends to constitute a cylinder, a shaft fixedly mounted at its ends with an intermediate exterior screw portion of steep pitch on which the tube is journaled for rotation, a movable traveler threaded on the screw portion and connected to the tube, means for controlling pressure in the cylinder to move the traveler along the shaft to rotate the roller and unwind the curtain or shade, and means to reverse the movement of the traveler to rewind the curtain or shade.

5. A glare shield for the rear wndow of an automobile, comprising a roller supported in operative relation to the said window and having a curtain or shade wound thereon, the said roller being composed of a tube closed at its ends to constitute a cylinder, a shaft extending through the tube and forming journals therefor, and brackets in which the shaft is fixedly mounted, the said shaft being provided intermediate its journal ends with an exterior screw portion of steep pitch, a traveler threaded on the screw portion and having a rotating traverse thereover, connections between the traveler and the tube, whereby rotation of the traveler is transmitted to the tube, one end of the shaft being bored for control of pressure in the cylinder to move the traveler and effect rotation of the roller to unwind the curtain or shade.

6. A glare shield for the rear window of an automobile, comprising a roller supported in operative relation to the said window and having a curtain or shade wound thereon, the said roller being composed of a tube closed at its ends to constitute a cylinder, a shaft extending through the tube and forming journals therefor, and brackets in which the shaft is fixedly mounted, the said shaft being provided intermediate its journal ends with an exterior screw portion of steep pitch, a traveler threaded on the screw portion and having a rotating traverse thereover, connections between the traveler and the tube, whereby rotation of the traveler is transmitted to the tube, one end of the shaft being bored for control of pressure in the cylinder to move the traveler and effect rotation of the roller to unwind the curtain or shade, and means on the instrument board to control the pressure.

In testimony whereof, I have signed my name at Milwaukee, this 19th day of July, 1928.

R. STRESAU.